United States Patent [19]

Meyers

[11] 4,363,236
[45] Dec. 14, 1982

[54] METHOD AND APPARATUS FOR DETECTING LEAKS IN A STRUCTURE

[76] Inventor: Harry W. Meyers, 843 Kings Croft, Cherry Hill, N.J. 08034

[21] Appl. No.: 144,743

[22] Filed: Apr. 28, 1980

[51] Int. Cl.³ ............................................. G01M 3/26
[52] U.S. Cl. ........................................................ 73/40
[58] Field of Search ................... 73/40, 38, 49.1, 49.5, 73/37

[56] References Cited

U.S. PATENT DOCUMENTS

| | | | |
|---|---|---|---|
| 2,898,836 | 8/1959 | Lockheed | 98/1.5 |
| 4,055,074 | 10/1977 | Thimons et al. | 73/40 |
| 4,241,871 | 12/1980 | Newell | 98/1.5 |
| 4,261,256 | 6/1979 | Joret | 98/1.5 |

FOREIGN PATENT DOCUMENTS 418748 10/1934 United Kingdom .................... 98/33

*Primary Examiner*—Donald O. Woodiel
*Attorney, Agent, or Firm*—Benasutti Associates, Ltd.

[57] ABSTRACT

The disclosed apparatus is intended for use in determining the breathing characteristics of a structure such as a home, office building, or business establishment. After establishing the initial breathing characteristics, it is possible through the use of disclosed apparatus to seal the structure so as to achieve breathing characteristics which are consistant with the intended use of the structure.

23 Claims, 5 Drawing Figures

METHOD AND APPARATUS FOR DETECTING LEAKS IN A STRUCTURE

BACKGROUND OF THE INVENTION

Field of the Invention

The instant invention lies generally in the field of leak detection and particularly in the field of leak detection for a structure such as a home, office building, or business establishment. As the cost of energy and the availability of energy for use in heating and cooling buildings such as homes, office buildings, and places of business, becomes increasingly burdensome, it becomes increasingly imperative that the energy which is used provide the maximum benefit. The waste of energy which results from heating and cooling being lost through poor construction tolerances, techniques and building settlement is easily appreciated.

SUMMARY OF THE INVENTION

The instant invention provides a method and apparatus for partially removing the air from a structure. By evacuating a building it is possible to determine the amount of air leakage into a structure through cracks and crevices. After the building has been evacuated the apparatus is then dampened so as to reach an equilibrium between the air which is leaking into the building and the air which is being exhausted from the building by the apparatus. When an equilibrium has been reached such that the two volumes of air are equal, it is then possible to proceed about the building and seal the sources of leakage. As the structural leaks are corrected, it will be necessary to further dampen the apparatus so as to reduce the amount of air being evacuated from the building and to again reach an equilibrium. It will be recognized that no building is intended to be completely air tight, as the building must be able to "breathe", so that the normal life activities carried on in a building may proceed unimpaired. It is generally recognized that there must be some breathing to provide oxygen and air for combustion and gas exchange within the home or structure.

It is an object of the instant invention to provide an apparatus for detecting structural leaks in a building without regard to outside weather conditions.

It is an object of the instant invention to provide an apparatus for detecting structural leaks within a building.

It is an object of the instant invention to provide an apparatus which may be continually adjusted as the leaks within a building are sealed.

DESCRIPTION OF THE PREFERRED EMBODIMENT

Figure 1:
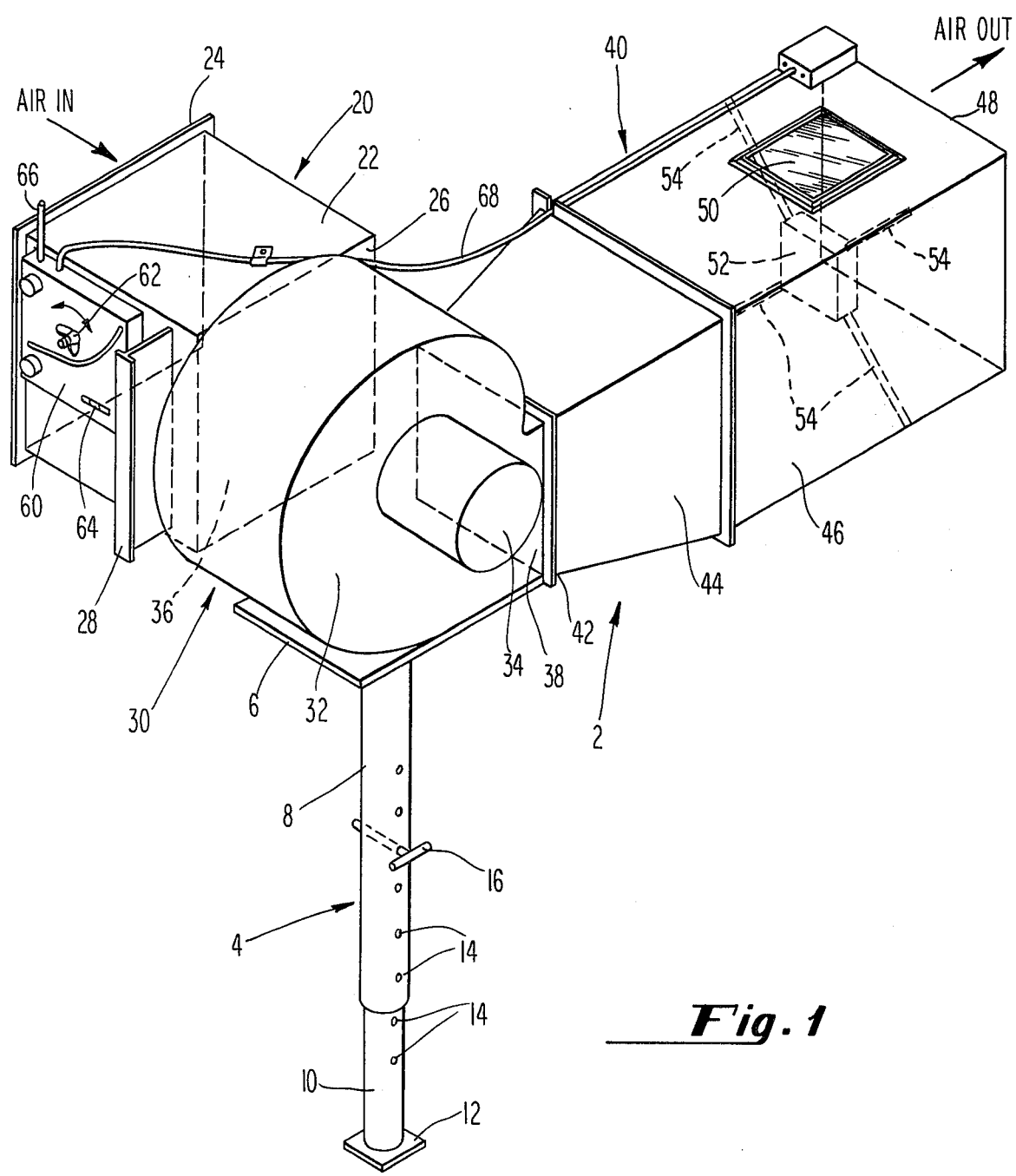
FIG. 1 is an orthographic projection of an apparatus according to the instant invention.

Referring now to the drawings, the apparatus will be described in detail; like numerals indicate like elements in all the figures.

Referring now to FIG. 1, there is shown the apparatus 2, mounted on a stand 4. The stand 4 does not form part of the apparatus. Stand 4 is intended only as an aid in leveling the apparatus and securing it in an aperture in a building. It will be obvious that other means of support may be used in place of stand 4. Stand 4, as shown in FIG. 1, consists primarily of platform 6, an outer supporting post 8, an inner supporting post 10 and a pod 12. The outer post 8 and inner post 10 have a plurality of bores 14 therethrough which are spaced apart an equal distance. A T-pin 16 is provided so that when the bores 14 of the outer post 8 and the inner post 10 are properly aligned, it may be located in the aligned bores to secure the stand. This provides for a telescoping stand of variable height.

Referring now to the apparatus 2, there is an air inlet portion 20, an evacuating fan portion 30, an air exhaust portion 40. Air inlet portion 20 is comprised generally of a square open ended duct 22, which may be fabricated from sheet metal, plastic or any other suitable material. Duct 22 has a first end 24 which is open to the atmosphere and a second end 26 which is adjoined to the inlet side of the exhausting fan 30. A slot 27 is provided on one side of the duct 22 so that a damper 28 may be inserted therein. The purpose and use of damper 28 will be explained more fully hereinafter. Also mounted on one side of duct 22, is a manometer 60. Manometer 60 is a Dwyer Mark II Manometer, Model No. 25, available from Dwyer Instruments, Inc., P.O. Box 373, Michigan City, Ind. 46360. Manometer 60 is mounted to duct 22 via a bolt and wing nut. The wing nut 62 can be loosened and secured to permit leveling of the manometer 60. Manometer 60 has a level gauge 64 which is built into the case of the manometer as an aid in leveling the manometer on the duct 22. The need to level the manometer will be obvious to those skilled in the art, as the manometer is a known instrument. The manometer 60 is fastened to duct 22, as previously mentioned, with an inlet tube 66 which is open to the atmosphere within the building and a second tube 68 which is extended so as to exit the building and be open to the atmosphere outside of the structure. The use of manometer 60 will be explained more fully hereinafter in the operational section.

As previously mentioned an exhausting fan 30 is provided adjacent to open end 26 of duct 22. The exhausting fan 30 in the preferred embodiment is W. W. Granger Blower Unit Model No. 4CO54-6 manufactured by the W. W. Granger Company. Exhausting fan 30 is a rotary or squirrel type of a blower having a motor 34 mounted on one side of a housing 32. The housing 32 has a side opening 36 which is not shown. Side opening 36 is fitted to opening 26 of duct 22. In keeping with this type of exhausting fan there is a opening 38 provided along one arc of the circumference of housing 32. Thus as the evacuating fan 30 is operated, air is drawn through the opening 36 and driven out the opening 38.

Turning now to exhaust duct 40, there is a first end 42 which has been configured to mate with the opening 38 of exhausting fan 30. There is a outwardly flared intermediate portion 44 which is seamed with outer portion 46. Outer portion 46 of exhausting duct 40 has a opening 48 which is opened to the outside atmosphere. As may be appreciated, the intermediate portion 44 and outer portion 46 may be of the same size. However, it is believed that this time that it is advantageous to maintain the same cross-sectional area between the intake and exhaust ducts, or at least avoids substantially different cross-sectional areas. On the top surface of outer portion 46 there is provided a viewing glass or window 50. The viewing glass 50 is provided so that the direct reading anemometer 52 which is mounted within portion 46 may be easily read. The direct reading anemometer 52 is a Bacharach Instruments Company, Direct Reading Anemometer Model MRF50 available from, Bacharach Instruments Company, Division of Ambac Ind., Inc., 625 Alpha Drive, RIDC Industrial Park, Pittsburgh, Pa. 15238. The anemometer 52 is mounted in the center of duct 46 by a series of mounting struts 54 and collar 56. The use of anemometer 52 will be explained more fully hereinafter in the operation section.

Figure 2:
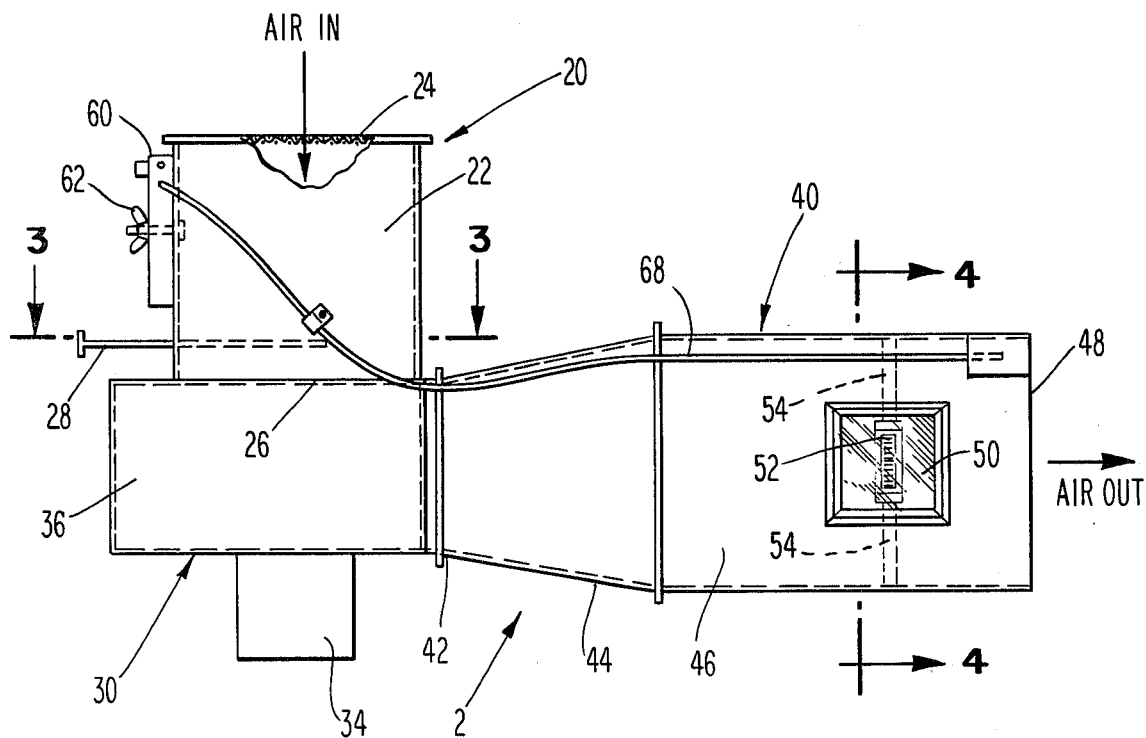
FIG. 2 is a top plan view of an apparatus according to the instant invention.

Referring now to FIG. 2, the top plan view of the apparatus it is possible to see that air will enter through opening 24 and will exit through opening 48. Likewise, it can be seen that the window 50 provides a reading access to the anemometer 52.

Figure 3:
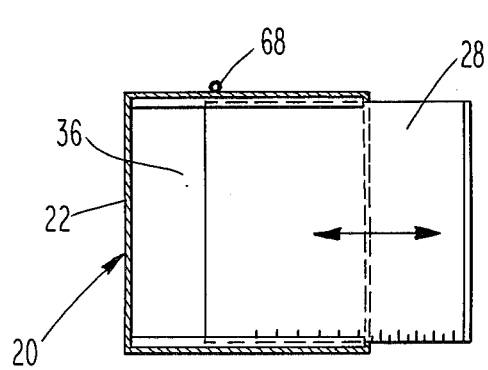
FIG. 3 is a section taken through the line 3—3 of FIG. 2.

Referring now to FIG. 3, there is shown a section through the line 3—3 of FIG. 2 which shows the operation of damper 28. It is clear from FIG. 2 that the damper may be slideably adjusted between maximum opened and maximum closed positions to controll the cross-sectional area of the duct 22 and thereby control the volume of air which flows through the duct.

Figure 4:
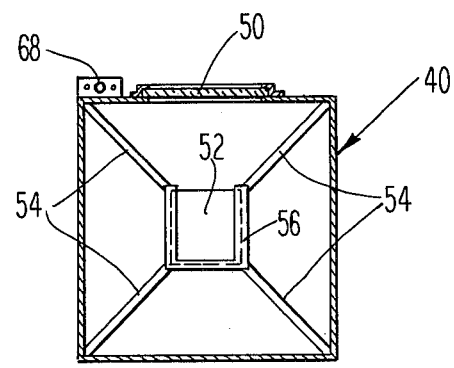
FIG. 4 is a section taken through the line 4—4 of FIG. 2.

Referring now to FIG. 4, it can be seen that the supports 54 which hold the anemometer 52 in place actually are supporting a U-shaped collar 56 in which the anemometer 52 may be easily placed. The reason for the collar 56 is so that in transportation of the apparatus the anemometer may be moved and placed in a proper carrying case. Note also in FIG. 4 it is possible to see that the tube 68 is opened to the atmosphere outside of the building.

Figure 5:
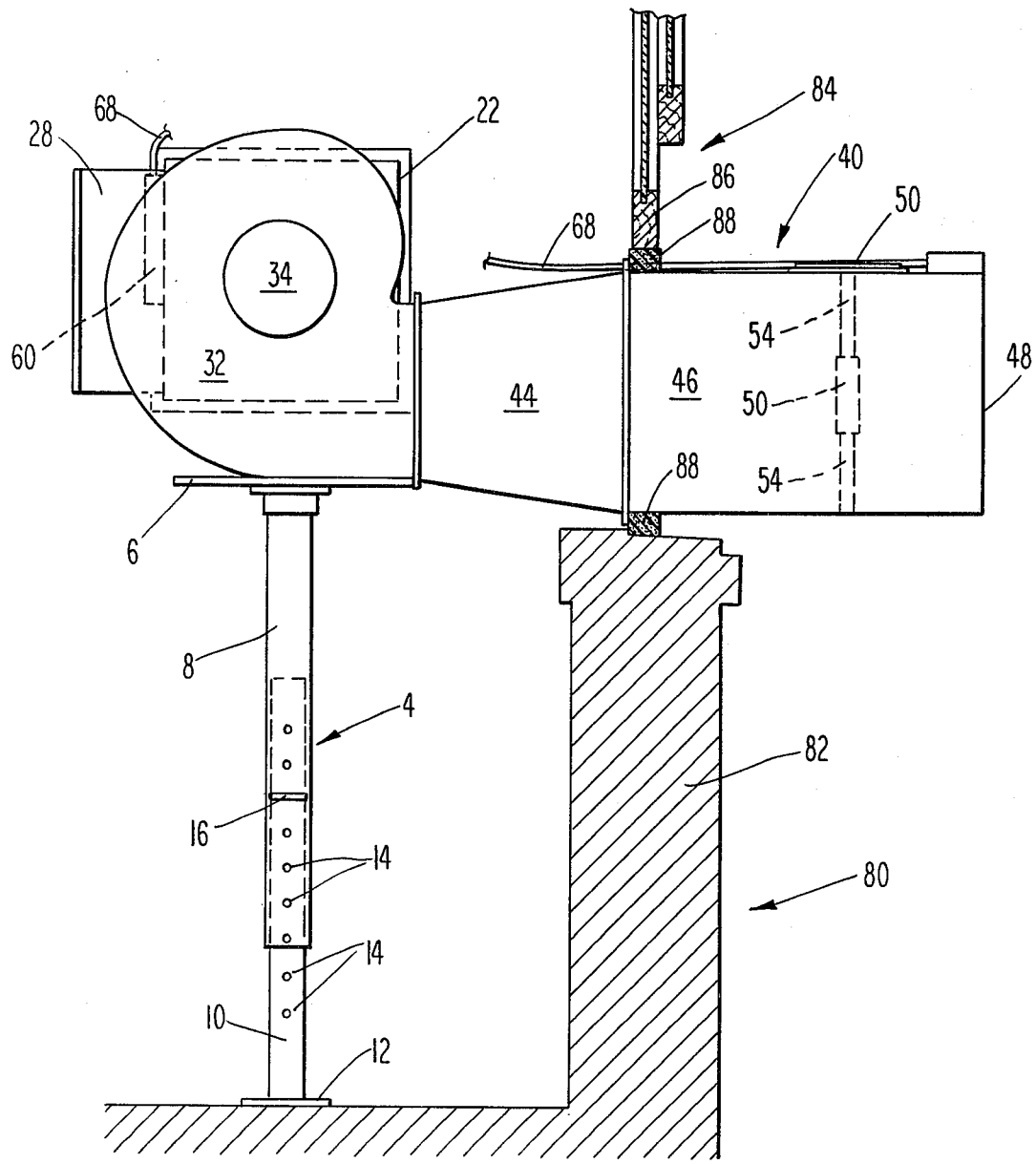
FIG. 5 is a side elevation showing the apparatus of the instant invention in a illustrative installation within a building structure.

Referring now to FIG. 5, it is possible to see how the apparatus of the instant invention is located in a building or structure. Assume, that the building 80 has a lower structural wall 82 and a window 84. The apparatus 2, is leveled using the stand 4, so that the outer portion 46 of duct 40 will extend out of the building to the atmosphere surrounding the building. The window sash 86 is drawn downwardly against the upper portion of the duct 40 so that the duct 40 may be sealed between the window sill and the window sash using gasket material 88. It should also be understood that the sides of the duct 40 are sealed so that the window is now essentially in a sealed relationship with the exhausting duct 40 from the apparatus 2.

In operation the remaining windows, doors and apertures of the building are closed in the usual fashion without any additional sealing being done prior to starting the apparatus in operation. After the apparatus 2 has been securely fixed and leveled, the anemometer 52 is placed in the collar 56 and the manometer 60 is mounted and leveled on duct 22. At that time, the exhausting fan 30 is set in operation with the damper 28 in the full open position. A sufficient amount of air is quickly drawn from the building and exhausted so as to create a vacuum reading on manometer 60. Once the vacuum reading or negative pressure reading has been established on manometer 60, the damper 28 is then adjusted inwardly until the manometer 60 reaches an equilibrium. At this point, the rate of air being exhausted from the building is balanced by the rate of air which is entering the building through cracks, crevices or other structural defects. Thus, we have established an equilibrium in the rate of air flow within and without of the building.

In order to determine what the air flow or leakage within the building is in terms of feet per hour a reading is now taken on the direct reading anemometer 52. The direct reading anemometer in the preferred embodiment reads in feet per minute. By multiplying the direct meter reading by a factor of 60 you obtain the air flow in feet per minute, you now have the actual leakage or air flow of a building established and can begin to correct air flow problems in order to establish an acceptable level of air leakage or breathing.

As it may be appreciated it is now possible to proceed about the building sealing the air leaks which are coming through the structure. Since the apparatus is constantly drawing air through these leaks it is akin to having a windy day pushing air through the leaks so that the leaks may easily be detected by a hand, a piece of paper, or a candle flame which is held adjacent structural joints such as windows, doors, walls, floors, etc. As the building becomes increasingly more secured against leakage, it will be noted that the manometer 60 will begin to indicate a negative flow rate or vacuum. Therefore, it will be required periodically to adjust the flow rate by moving the damper 28 increasingly further into the duct 24. It has been noticed that as this choking down is performed, that there is some difficulty with getting proper readings from the annemometer 52 because of its central location within the duct 40. To overcome this difficulty, it has been discovered that a hand held anemometer may be moved about the four corners of the duct and then the readings obtained in this manner averaged with that reading obtained from the stationary anemometer 52. Likewise, if desired at this point, the stationary anemometer 52 may be removed and hand held anemometer may be moved about in a series of different point readings if that is so desired.

It is recognized, that every building or structure as previously mentioned has breathing characteristics which are essential to support the activity within the building and to assure such things as air for combustion of fuels of heating systems, replenishment of oxygen and such; therefore it is not considered desirable to seal a building totally but rather to achieve an acceptable "level of leakage". By establishing that acceptable level of leakage it is possible to seal the leaks creating the excess and to continually monitor the sealing through use of this apparatus until optimum leakage rates are achieved.

One additional feature which has been noticed with the use of a stationary anemometer 52 as opposed to a hand held anemometer is that stationary anemometer 52 requires a sufficient duct length 20 to assure that there is a straightening of the air flow from the evacuating fan 30 so that the air will move through the center of duct 40 and over anemometer 52. In the event that it is not possible to achieve this air straightening or that the choking achieved through the dampening effect of damper 28 is again suggested that a hand held anemometer be used to achieve proper readings of the air flow through duct 40.

Having fully disclosed my invention, it is understood that the invention may be modified by those having skill in the art and that the scope of my invention is set forth in the claims appended hereto.

I claim:

1. An apparatus for detecting the breathing characteristics of a structure having at least one aperture available to the atmosphere outside said structure, said apparatus comprising:
   a first duct having first and second open ends, said first end opening to the atmosphere within said structure;
   an evacuation means, said evacuation means having an inlet portion and an outlet portion said inlet portion of said evacuation means being in a sealed relationship with said second open end of said first duct;
   a second duct having a first end, said first end being in a sealed relationship to said outlet portion of said evacuation means, and a second open end which is open to the atmosphere without said structure;
   air velocity gauge means positioned approximate to said open end of said second duct; and
   air gauge means for determining relative differences in pressure within and without said structure.

2. The apparatus of claim 1 wherein said air gauge means further comprises a first atmospheric pressure inlet open to the atmosphere within said structure and a second atmospheric pressure open to the atmosphere without said structure.

3. The apparatus of claim 2 wherein said air gauge means further comprises a first tube open to the atmosphere within said structure and a second tube open to the atmosphere without said structure.

4. The apparatus of claim 1 wherein said air gauge means comprises a manometer.

5. The apparatus of claim 4 wherein said manometer is externally mounted on said first duct.

6. The apparatus of claim 1 wherein said evacuation means comprises a rotary blower.

7. The apparatus of claim 1 wherein said air velocity gauge means comprises an anemometer.

8. The apparatus of claim 7 wherein said anemometer is mounted substantially at the center of said second duct and within said second open end of said second duct.

9. The apparatus of claim 8 wherein said anemometer is removable mounted in a collar means.

10. An apparatus for detecting the breathing characteristics of a structure having at least one aperture available to the atmosphere outside structure, said apparatus comprising:
    a first duct, said first duct having a first open end and a second open end;
    an evacuation means, said evacuation means having an inlet portion and an outlet portion, said evacuation means having said inlet portion in a sealed relationship with the second end of said first duct;
    a second duct having a first open end; said first open end being in a sealed relationship to said outlet portion of said evacuation means, and a second open end which is in a sealed relationship with said aperture in said structure and opened to the atmosphere without said structure;
    an air wind velocity gauge positioned approximate to said second open end of said second duct; and
    a gauge means for establishing a difference in atmospheric pressure between the atmosphere within said structure and the atmosphere without said structure.

11. A method for detecting the flow of characteristics of atmospheric gases within a structure having at least one aperture available to the atmosphere outside said structure, said method comprising the steps of:
    securing an exhausting means in said aperture;
    exhausting the atmospheric gases within the structure at a rate sufficient to achieve a pressure differential between the atmosphere within and without said structure;
    gauging said pressure differential with an atmospheric pressure gauge,
    adjusting the rate of exhaustion to achieve a substantial equilibrium between the rate of atmosphere being exhausted from said structure and the rate of atmosphere entering said structure, and;
    gauging the rate of exhaustion with an air flow gauge to determine the volume of flow.

12. The method of claim 11, wherein said air flow gauge is an anemometer.

13. The method of claim 11 wherein said atmospheric pressure gauge is a manometer.

14. The method of claim 13 wherein the rate of exhaustion is adjusted by dampening said exhausting means.

15. An apparatus for detecting the breathing characteristics of a structure having at least one aperture available to the atmosphere outside said structure, said apparatus comprising:
    evacuation means having an inlet portion and an outlet portion, said inlet portion open to the atmosphere within said structure and said outlet portion open to the atmosphere without said structure;
    air gauge means for determining relative differences in pressure within and without said structure, and;
    air velocity gauge means positioned approximate to said outlet portion.

16. The apparatus of claim 15 wherein said apparatus further comprises:
    air dampening means for dampening said inlet portion of said evacuation means.

17. The apparatus of claim 16 wherein said air velocity gauge means comprises an anemometer.

18. The apparatus of claim 17 wherein said anemometer is positioned substantially at the center of said outlet portion of said evacuation means.

19. The apparatus of claim 15 wherein said air velocity gauge means comprises an anemometer.

20. An apparatus for detecting the breathing characteristics of a structure having at least one aperture available to the atmosphere outside said structure, said apparatus comprising:
    evacuation means having an inlet portion and an outlet portion, said inlet portion open to the atmosphere within said structure and said outlet portion open to the atmosphere without said structure;
    air dampening means associated with said inlet portion;
    air gauge means for determining relative differences in pressure within and without said structure; and
    an air velocity gauge means positioned approximate to said outlet portion.

21. A method for detecting the flow characteristics of a structure having at least one aperture available to the atmosphere outside said structure, said method comprising:
    securing an exhausting means in said aperture;
    exhausting the atmosphere within said structure at a rate sufficient to achieve a pressure differential between the atmosphere within and without said structure;

gauging the pressure differential between the atmosphere within and without said structure, and;
gauging the rate of exhaustion with an air flow gauge to determine the volume of flow.

22. The method of claim 20 further comprising:
adjusting the rate of exhaustion to achieve a substantial equilibrium between the rate of atmosphere being exhausted from said structure and the rate of atmosphere entering said structure.

23. The method of claim 21 wherein the rate of exhaustion is adjusted by dampening said exhausting means.

* * * * *